United States Patent
Reidt

(10) Patent No.: US 9,332,611 B2
(45) Date of Patent: May 3, 2016

(54) METHOD FOR CONTROLLING A MULTI-COLOR SIGNAL ASSEMBLY, AND MULTI-COLOR SIGNAL ASSEMBLY

(71) Applicant: Georg Reidt, Swisttal (DE)

(72) Inventor: Georg Reidt, Swisttal (DE)

(73) Assignee: EATON ELECTRICAL IP GMBH & CO. KG, Schoenefeld (DE)

( * ) Notice: Subject to any disclaimer, the term of this patent is extended or adjusted under 35 U.S.C. 154(b) by 69 days.

(21) Appl. No.: 14/362,934

(22) PCT Filed: Dec. 10, 2012

(86) PCT No.: PCT/EP2012/074937
§ 371 (c)(1),
(2) Date: Jun. 5, 2014

(87) PCT Pub. No.: WO2013/083835
PCT Pub. Date: Jun. 13, 2013

(65) Prior Publication Data
US 2015/0189715 A1 Jul. 2, 2015

(30) Foreign Application Priority Data
Dec. 9, 2011 (EP) .................................... 11192786

(51) Int. Cl.
*G05F 1/00* (2006.01)
*H05B 33/08* (2006.01)
*H05B 37/02* (2006.01)

(52) U.S. Cl.
CPC ........ *H05B 33/0857* (2013.01); *H05B 33/0818* (2013.01); *H05B 33/0842* (2013.01); *H05B 37/0254* (2013.01); *Y02B 20/346* (2013.01)

(58) Field of Classification Search
USPC ........ 315/295, 294, 297, 291, 307, 308, 362, 315/360
See application file for complete search history.

(56) References Cited

U.S. PATENT DOCUMENTS

| 2006/0279519 | A1* | 12/2006 | Wang ..................... G09G 5/006 345/102 |
| 2007/0085786 | A1* | 4/2007 | Lin ....................... G06F 3/0202 345/82 |
| 2008/0100224 | A1 | 5/2008 | Felder et al. |
| 2008/0136334 | A1 | 6/2008 | Robinson et al. |
| 2012/0326633 | A1 | 12/2012 | Enenkel |

FOREIGN PATENT DOCUMENTS

DE 102010005907 A1 7/2011

* cited by examiner

*Primary Examiner* — Douglas W Owens
*Assistant Examiner* — Jianzi Chen
(74) *Attorney, Agent, or Firm* — Leydig, Voit & Mayer, Ltd.

(57) ABSTRACT

A method for controlling a multi-color signal assembly with a multi-color LED, a connection for voltage supply, and a control input. The control input is connected to a control output of a first control unit for controlling the signal assembly by pulse-width modulation signals (PWM signals) or to a signal assembly control output by the bus communication. After a supply voltage $U_B$ is connected, voltage $U_{DI/BUS}$ at the control input is measured within a predetermined time span $\Delta t$, wherein the first and second control units have respective first and second voltages at the control input within the time span $\Delta t$, wherein the first and second voltage are different. The signal assembly is placed in a BUS mode or in a PWM mode depending on the measured voltage $U_{DI/BUS}$, can be controlled by bus communication in the BUS mode, and can be controlled by PWM signals in the PWM mode.

14 Claims, 3 Drawing Sheets

METHOD FOR CONTROLLING A MULTI-COLOR SIGNAL ASSEMBLY, AND MULTI-COLOR SIGNAL ASSEMBLY

CROSS-REFERENCE TO RELATED APPLICATIONS

This application is a U.S. National Stage Application under 35 U.S.C. §371 of International Application No. PCT/EP2012/074937 filed on Dec. 10, 2012, and claims benefit to European Patent Application No. EP 11192786.9 filed on Dec. 9, 2011. The International Application was published in German on Jun. 13, 2013, as WO 2013/083835 A1 under PCT Article 21(2).

FIELD

The invention pertains to a procedure for controlling a multicolored signal arrangement with a multicolored-LED, a connection to voltage supply and a control input.

BACKGROUND

Nowadays, display elements and signal arrangements have multicolored-LED for display or for signalling of status in electronic systems. The control of such signal arrangements requires the provision of a suitable interface in the signal arrangement. Normally, the signal arrangement is controlled with PWM-signals for a stored programme control (SPC) so as to obtain a variable color rendition. The alternatively, particularly in the automotive sector, the signal arrangement is controlled by a suitable control unit, whereby the signal arrangement in this case must be equipped with an appropriate, special bus-interface.

Hence the signal arrangement can normally be only controlled either with PWM-signals or with bus-communication, which restricts its range of application correspondingly.

SUMMARY

An aspect of the invention provides a process of controlling a multicolored signal arrangement including a multicolored-LED, a voltage supply connection, and a control input, the process comprising: connecting the control input of the signal arrangement with a first control output of a first control unit, the first control unit being a programmable control system configured to control the signal arrangement using PMW signals, or connecting the control input with a second control output of a second control unit, the second control unit being configured to control the signal arrangement using an asymmetrical bus-communication; and switching on a supply voltage, $U_B$, to the signal arrangement over the voltage supply connection of the signal arrangement; measuring a first measured voltage, $U_{DI/Bus}$ at the control input of the signal arrangement within a pre-determined time interval, $\Delta t$, after the switching-on of the supply voltage, wherein the first control unit generates a first voltage at the control input within the time interval $\Delta t$, and the second control unit generates a second voltage at the control input within the time interval $\Delta t$, the first voltage differing from the second voltage, the first or second control unit being programmed to obtain the differing voltages; moving the signal arrangement into a BUS-mode or into a PWM-mode depending on the measured voltage $U_{DI/Bus}$, wherein the signal arrangement in the BUS-mode can be controlled with bus-communication and the signal arrangement in the PWM-mode can be controlled with the PWM-signals; and moving the signal arrangement into the PWM-mode depending on the first measured voltage $U_{DI/Bus}$, if the signal arrangement is connected to the first control unit, or moving the signal arrangement into the BUS-mode if the signal arrangement is connected to the second control unit; and conveying, in parallel, control signals of the first and second control units to a UART-input and a digital input, DI-input, of a microcontroller of the signal arrangement, wherein, in the BUS-mode of the signal arrangement, the control signals are evaluated only over the UART-input, and wherein, in the PWM-mode of the signal arrangement, the control signals are evaluated only over the DI-input.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
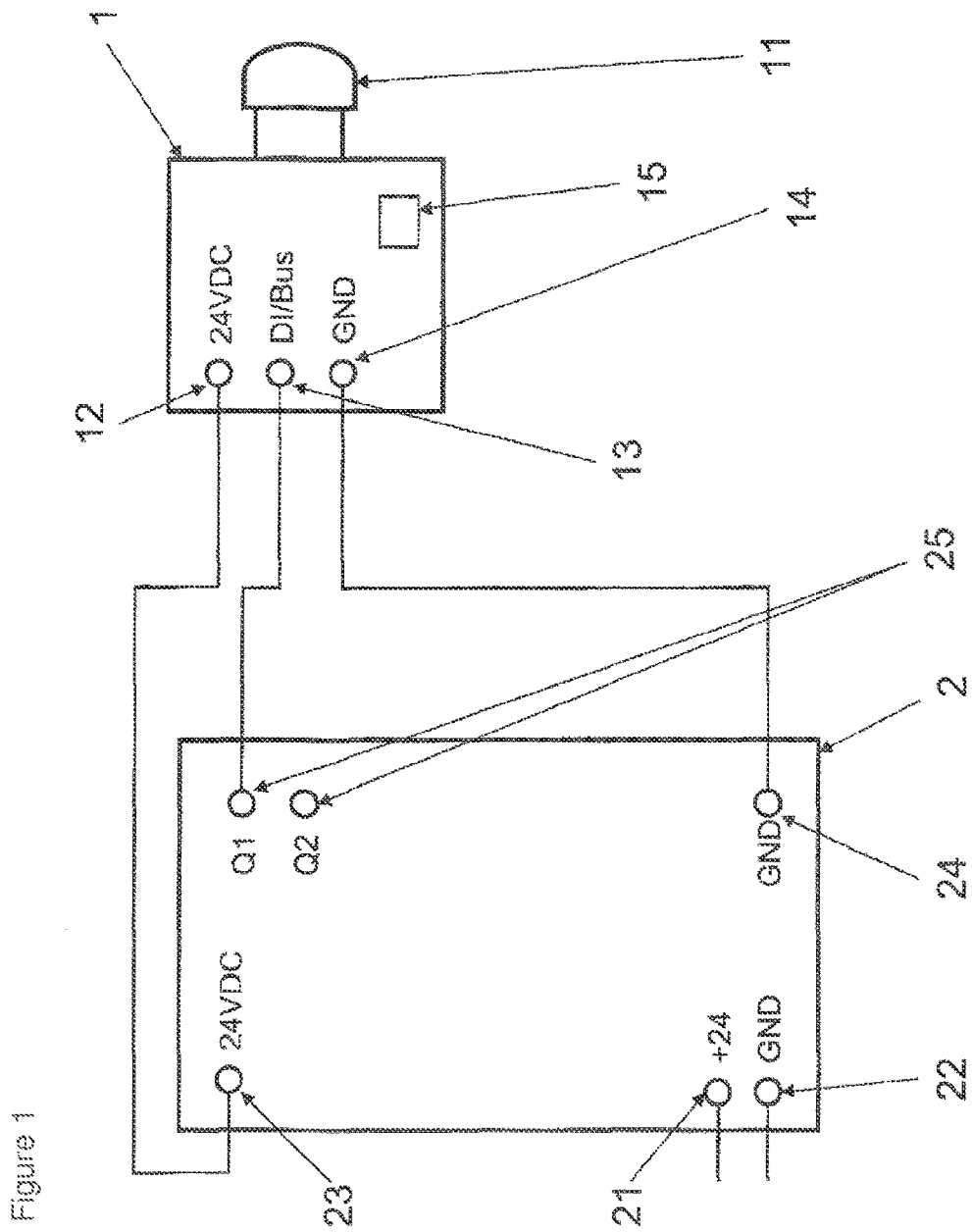
FIG. 1 A suitable multicolored signal arrangement for carrying out the procedure in accordance with this invention, whereby the signal arrangement is connected to a first control unit.

An aspect of the present invention provides a procedure for the controlling of a signal arrangement which enables a flexible application of the signal arrangement.

An aspect of the invention pertains to a procedure for controlling a multicolored signal arrangement with a multicolored-LED, a connection to voltage supply and a control input, whereby the control input of the signal arrangement is connected to a control output of a first control unit for controlling the signal arrangement with pulse modulation signals (PWM-signals) or with a control output of a second control unit for controlling the signal arrangement with bus-communication.

Accordingly, within the framework of the procedure in accordance with the invention, the multicolored-signal arrangement that has a connection to the supply voltage of the signal arrangement as well as a control input for the control of the signal arrangement over a multicolored-LED, is optionally connected to a control output of a first control unit for controlling the signal arrangement with PWM-signals or with a control output of a second control unit for controlling the signal arrangement with bus-communication. The first control unit is advantageously an SPC, whereby the SPC preferably has an output to the voltage supply, for example 24VDC and a digital output for transferring the PWM-signals. The second control unit is advantageously realized by a bus-Master-Device for controlling an asymmetrical communication, for example a LIN-bus-Master, a Single-Line-CAN-Control Unit or something similar. The second control unit has a connection to the voltage supply and a connection for transferring the bus-data. Preferably, a ground output (GND) of the second control unit is connected with a corresponding GND-input of the signal arrangement, so that the reference potential for the asymmetrical communication is established. The second control unit can advantageously be integrated into a power switch.

According to as aspect of the invention, a supply voltage $U_B$ of, for example 24V, is switched on over the connection to the voltage supply of the signal arrangement, so that the voltage supply to the signal arrangement is ensured.

The signal arrangement is made operational by establishing the connection to the voltage supply and to the control of the signal arrangement. Subsequently, according to the invention, the voltage $U_{DI/Bus}$ at the control input of the signal arrangement is measured within a pre-determined time interval $\Delta t$, which for example can lie between 100 ms and 1000 ms, preferably between 200 ms and 700 ms. Thereby the procedure according to this invention presupposes that the first control unit has a first voltage at least in part within the time interval $\Delta t$, and that the second control unit has a second voltage within the time interval $\Delta t$, and that the first voltage differs from the second voltage. This is preferably achieved by an appropriate programming of the first or the second control unit. One can differentiate between the connected control units on the basis of the difference between the first and the second voltage. Depending on the measured voltage $U_{DI/Bus}$, the signal arrangement is after all moved either into a PWM-mode if the signal arrangement was connected to the first control unit, or into a BUS-mode if the signal arrangement was connected to the second control unit. If the signal arrangement is in the PWM-mode, it can be controlled with the PWM-signals, and if the signal arrangement is in BUS-mode it can correspondingly be controlled with the bus-communication.

The decision as to in which of the two modes the signal arrangement is moved takes place preferably by an evaluation of the measured voltage $U_{DI/Bus}$. For example, if the evaluation is such that in case the voltage $U_{DI/Bus}$ meets a pre-determined condition, the signal element is moved into a BUS-mode, and if the voltage $U_{DI/Bus}$ does not meet the condition, the signal element is moved into a PWM-mode. Preferably, a voltage difference $\Delta U$, which is the difference between voltage $U_B$ and voltage $U_{DI/Bus}$, is compared to a pre-determined threshold value. The condition is considered to be met if $\Delta U$ is less than the threshold value.

In a particularly preferred embodiment of the procedure, the voltage $U_{DI/Bus}$ is measured several times within a time interval $\Delta t$ to account for possible errors of measurement and such like. The measurement could, for instance, comprise of 10 to 50 samples, whereby the sampling takes place in a suitable time grid, for example every 10 ms. For the evaluation of the measurements, the measured values of the voltage $U_{DI/Bus}$ are used, whereby the evaluation can encompass all suitable mathematical and/or logical processing of the measured values.

A preferred embodiment of the procedure in accordance with this invention provides that the control signals of the control unit connected to the signal arrangement from the control input of the signal arrangement are forwarded in parallel to a Universal-Asynchronous-Receiver-Transmitter-Input (UART-input) and to a, preferably interrupt-controlled, digital input (DI-input) of a microcontroller of the signal arrangement. After the signal arrangement has been moved into the BUS-mode, the control signals are evaluated only over the UART-input, whereas the control signals arriving at the DI-input are not evaluated by the microcontroller. Correspondingly, the control signals arriving at the UART-input are not evaluated by the microcontroller if the signal arrangement was moved into the PWM-mode. In this case the control signals are evaluated only over the DI-input of the microcontroller. The parallel data transfer ensures that the microcontroller can process both signal streams.

In a further preferred embodiment, the connection to the voltage supply of the signal arrangement is connected to an external energy feed. In case the signal arrangement for signalling of conditions of a switching device connected to it is provided for, the external feed can safeguard that even in the case of an interruption of power supply to the device, for example due to the tripping of a switch, the voltage supply of the control unit controlling the signal arrangement as well as the signal arrangement itself is ensured. This way the signal arrangement can still be used as a status indicator for the switch.

The connection between the control unit and the signal arrangement can used to advantage for transferring status information on the control unit and/or devices. In case, as described above, the control unit is connected to a switching device, information on its energy supply or the temperature in the switch can be transferred and made available, for example over the Bus-communication, to the signal arrangement. Preferably, the data or status information transferred in this way with a suitable interface of the signal arrangement, are kept ready for retrieval. In case the signal arrangement is provided with an interface for wireless communication, such as WLAN or Bluetooth interface, the diagnosis and/or status data transferred by the control unit can be forwarded to a device suitable for receiving it, such as a smartphone.

Over and above this, the invention concerns a multicolored signal arrangement for carrying out the procedure described above. Thereby, the multicolored signal arrangement has some of the properties and functionalities described above or random combinations of these properties and functionalities, so that the procedure in accordance with this invention can be carried out with the signal arrangement.

FIG. 1 shows a multicolored signal arrangement 1 in detail. The signal arrangement 1 comprises of a multicolored-LED 11 which, in this case, is realized as a RYB-LED (red-yellow-blue-LED) Further, the signal arrangement 1 consists of a connection to the voltage supply 12, a control input 13 and a ground connection 14. The control input 12 is connected to one of the control outputs 25 of a first control unit 2, which is realized here as an SPC. The first control unit 2 further comprises of a voltage supply connection 21 for the voltage supply of the control unit 2, so that a supply voltage can be switched-on by connecting a voltage supply connection 23 with the connection for voltage supply 12 of the signal arrangement 1 of signal arrangement 1. Over and above this, the control unit 2 has a ground connection 22 that is connected to ground, so that control unit 2 and the signal arrangement 1 can be brought to a common reference potential by connecting another ground connection 24 of the control unit 2 with the ground connection 14 of the signal arrangement 1. Over and above this, the signal arrangement 1 comprises of an interface for wireless communication 15.

Figure 2:
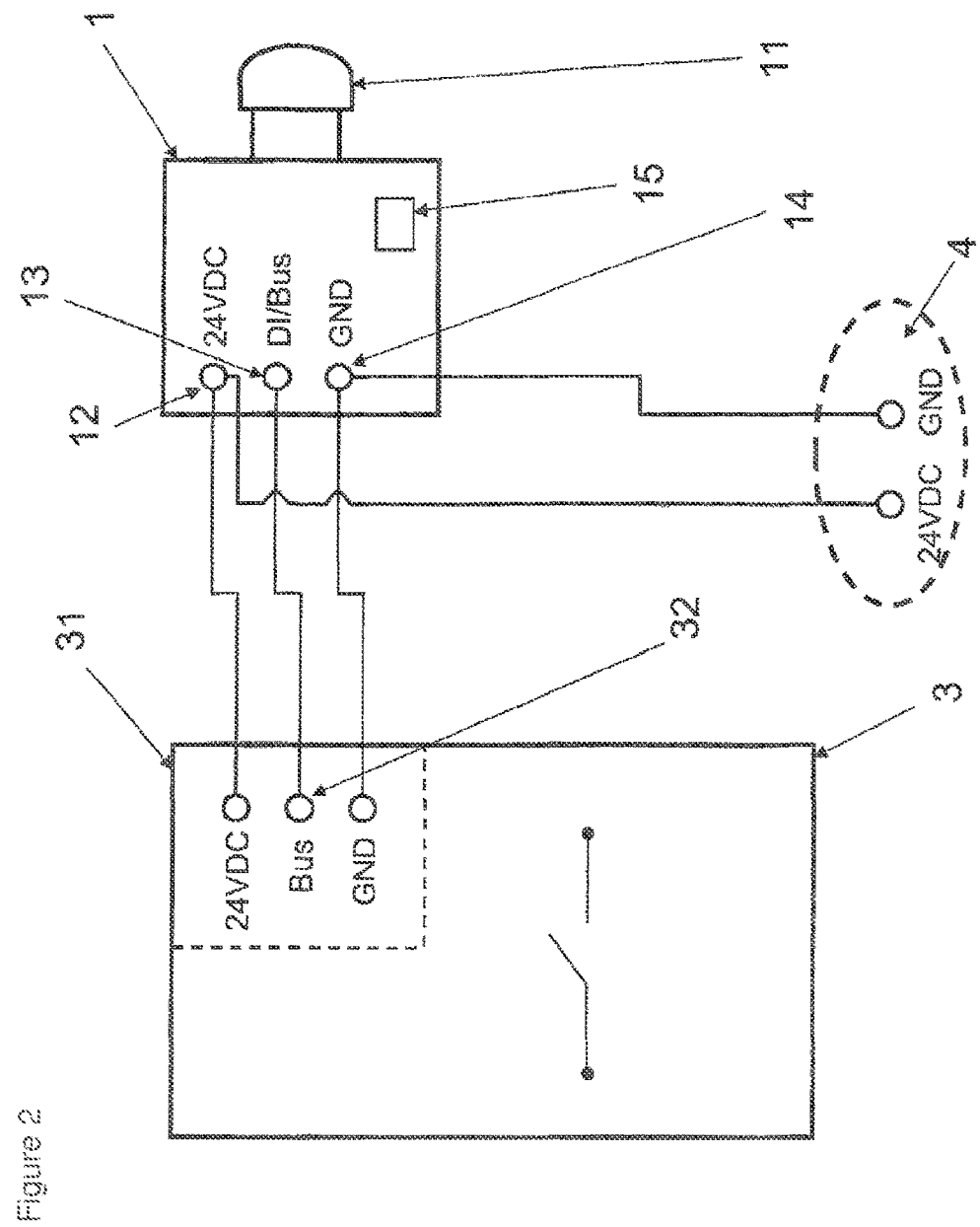
FIG. 2 A suitable multicolored signal arrangement for carrying out the procedure in accordance with this invention, whereby the signal arrangement is connected to a second control unit.

FIG. 2 shows the multicolored signal arrangement from FIG. 1, whereby the same or similar elements of signal arrangement 1 are marked with the same reference symbols. The control input 13 of signal arrangement 1 is connected to a control output 32 of a second control unit 31, whereby the second control unit 31 is connected to a switching device 3. Here, the second control unit is realized as a LIN-master, which controls the signal arrangement with corresponding LIN-bus-communication. The serial data transmission takes place over the connection between the control output 32 and the control input 13. The connection to the voltage supply 12 of the signal arrangement 1 is connected with the corresponding voltage supply connection of the second control unit 31. Correspondingly, the ground connection 14 of the signal arrangement is connected to the corresponding ground connection of the second control unit 31. The connection to the voltage supply 12 and the ground connection 14 are each connected with the corresponding connections to an external energy feed 4 by means of additional terminals. This way, the energy supply to control unit 31 can take place over the external feed 4.

Figure 3:
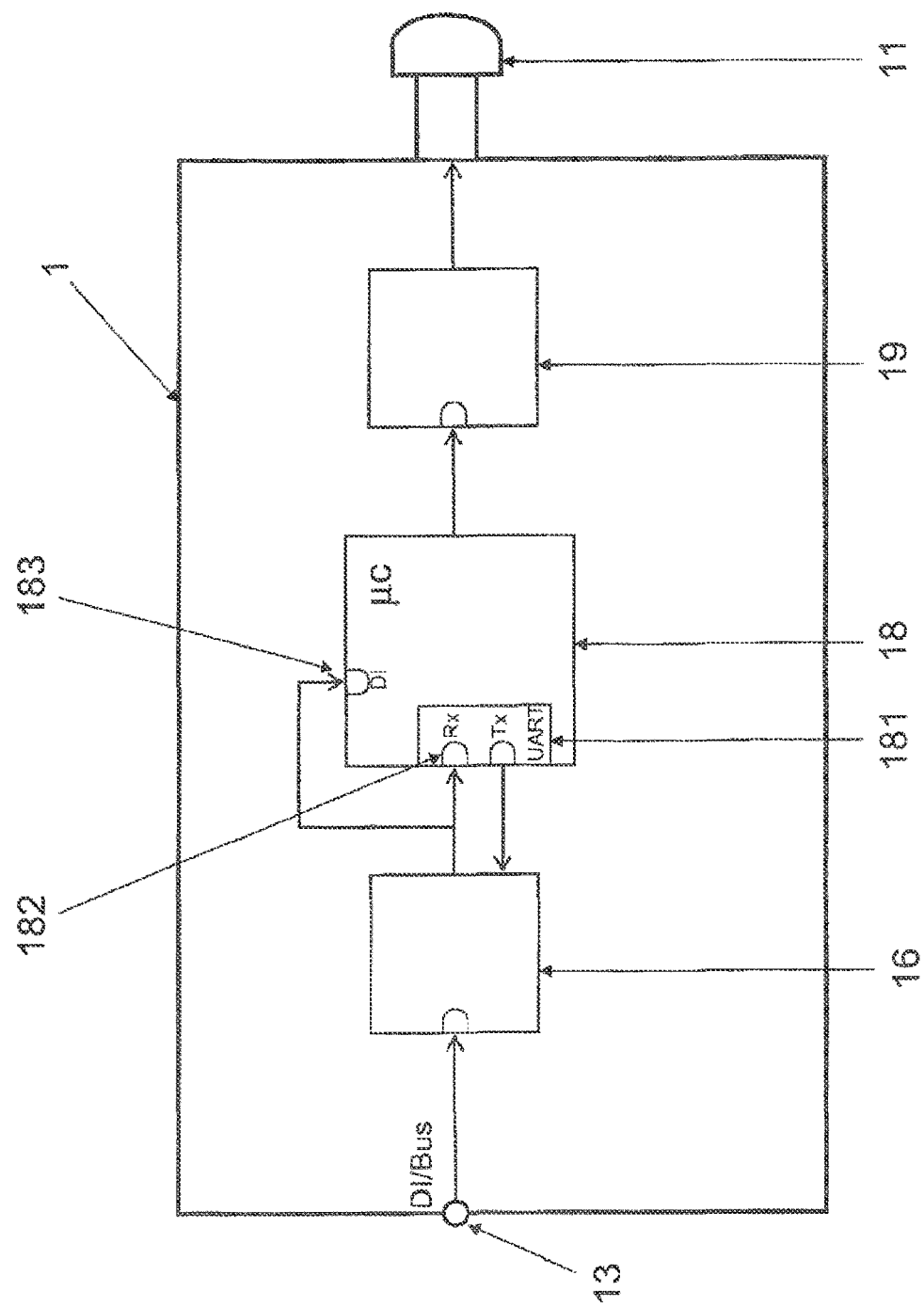
FIG. 3 A schematic part-illustration of a multicolored signal arrangement for carrying out the procedure in accordance with this invention.

FIG. 3 is a simplified illustration of the multicolored signal arrangement 1 from FIGS. 1 and 2, whereby the same or similar elements from both the Figures have been given the same reference symbols. In this view, only control input 13 of the signal arrangement 1, which can be connected to the control output of the first or the second control unit, has been shown. The control signals arriving at control input 13 are first forwarded to a LIN-transceiver 16. From there, the control signals are further forwarded in parallel to an Rx-input 182 of a UART-interface 181 of a microcontroller 18 as well as a digital input 183 of the microcontroller 18. In the BUS-mode of signal arrangement 1, the control signals that arrive at the digital input 183 are ignored, in PWM-mode of signal arrangement 1, the control signals that arrive at UART 181 are ignored. The microcontroller 18 forwards the processed control signals on to an LED-driver 19, which correspondingly controls the multicolored LED 11 For a better overview, the LED-driver 19 is shown here as an independent element. It is also possible to integrate the driver 19 into the microcontroller 18.

An embodiment of the procedure in accordance with this invention is explained with the help of FIG. 3. The signal arrangement 1 is connected with an SPC or a LIN-master over the control input 13. After the start-up of the signal arrangement 1 and the SPC or the LIN-master at time to by switching-on of a supply voltage of 24 V, the voltage at the control input 13 is sampled within a time interval of 500 ms after time to so that the signal arrangement can recognize whether it is being controlled with a PWM-signal or whether it must operate as a LIN-bus-participant. The operation mode of the signal arrangement is set by the following rules: If a voltage of 0 VDC is measured at control input 13 for a certain time, PWM-mode is set in the signal arrangement; if a voltage of 24 VDC is measured at control input 13 for a certain time, BUS-mode is set in the signal arrangement.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B, and C" should be interpreted as one or more of a group of elements consisting of A, B, and C, and should not be interpreted as requiring at least one of each of the listed elements A, B, and C, regardless of whether A, B, and C are related as categories or otherwise. Moreover, the recitation of "A, B, and/or C" or "at least one of A, B, or C" should be interpreted as including any singular entity from the listed elements, e.g., A, any subset from the listed elements, e.g., A and B, or the entire list of elements A, B, and C.

LIST OF REFERENCE SYMBOLS 1 multicolored signal arrangement
11 multicolored-LED
12 connection for voltage supply
13 control input
14 ground connection
15 interface for wireless communication
16 LIN-Transceiver-Unit
18 Microcontroller
181 UART
182 UART Rx-input
183 Digital input of the microcontroller
19 LED-driver
2 stored programmed control
21 voltage supply connection
22 ground connection
23 voltage supply connection
24 ground connection
25 control output
3 power switch
31 LIN-master
32 control output
4 voltage supply

The invention claimed is:

1. A process of controlling a multicolored signal arrangement including a multicolored-LED, a voltage supply connection, and a control input, the process comprising:
   connecting the control input of the signal arrangement with a first control output, of a first control unit, the first control unit being a programmable control system configured to control the signal arrangement using PMW signals,
   or
   connecting the control input with a second control output, of a second control unit, the second control unit being configured to control the signal arrangement using an asymmetrical bus-communication;
   and
   switching on a supply voltage, $U_B$, to the signal arrangement over the voltage supply connection of the signal arrangement;
   measuring a first measured voltage, $U_{DI/Bus}$ at the control input of the signal arrangement within a pre-determined time interval, $\Delta t$, after the switching-on of the supply voltage, wherein the first control unit generates a first voltage at the control input within the time interval $\Delta t$, and the second control unit generates a second voltage at the control input within the dine interval $\Delta t$, the first voltage differing from the second voltage, the first or second control unit being programmed to obtain the differing voltages;
   moving the signal arrangement into a BUS-mode or into a PWM-mode depending on the measured voltage $U_{DI/Bus}$, wherein the signal arrangement in the BUS-mode can be controlled with bus-communication and the signal arrangement in the PWM-mode can be controlled with the PWM-signals; and moving the signal arrangement into the PWM-mode depending on the first measured voltage $U_{DI/Bus}$, if the signal arrangement is connected to the first control unit, or moving the signal arrangement into the BUS-mode if the signal arrangement is connected to the second control unit;

and conveying, in parallel, control signals of the first and second control units to a UART-input and a digital input, DI-input, of a microcontroller of the signal arrangement, wherein, in the BUS-mode of the signal arrangement, the control signals are evaluated only over the UART-input, and wherein, in the PWM-mode of the signal arrangement, the control signals are evaluated only over the DI-input.

2. The process of claim 1, further comprising:

evaluating the first measured voltage $U_{DI/Bus}$ is evaluated in order to move the signal arrangement into the BUS-mode or into the PWM-mode, wherein the evaluating includes checking a voltage difference, ΔU, which is formed from a difference between the supply voltage $U_B$ and the first measured voltage $U_{DI/Bus}$, compared to a predetermined threshold value.

3. The process of claim 2, wherein the signal arrangement is moved into the BUS-mode, if the voltage difference ΔU is less than the threshold value.

4. The process of claim 2, wherein the signal arrangement is moved into the PWM-mode if the voltage difference ΔU is greater than the threshold value.

5. The process of claim 1, further comprising:

repeating the measuring of a voltage $U_{DI/Bus}$ at the control input of the signal arrangement within a pre-determined time period Δt2 after the switching-on of the supply voltage $U_B$, to obtain a second measured voltage $U_{DI/Bus}$, wherein the first and second measured voltage $U_{DI/Bus}$ are used for evaluation.

6. The process of claim 1, wherein the voltage supply connection is connected to an external feed.

7. The process of claim 1, further comprising:

transmitting status information on the first, second, or first and second control unit over the connection between the first, second, or first and second control unit and the signal arrangement.

8. The process of claim 7, further comprising:

earmarking the status information for retrieval by the signal arrangement using a suitable interface.

9. A multicolored signal arrangement, comprising:

a connection to a voltage supply of a signal arrangement;

a control input configured to control the signal arrangement and a multicolored-LED; and a measurement unit configured to measure a voltage, $U_{DI/Bus}$, at the control input within a time interval, Δt;

a movement unit, configured to move the signal arrangement into a BUS-mode or a PWM-mode; and a microcontroller, wherein the control input optionally includes a first control output of a first control unit, the first control unit being a programmed control, configured to control the signal arrangement using PWM-signals, and wherein the first control unit is configured to be connected to a second control output, included in a second control unit, the second control unit being configured to control the signal arrangement using an asymmetrical bus-communication, wherein the signal arrangement in the BUS-mode can be controlled with bus-communication, wherein the signal arrangement in the PWM-mode can be controlled with PWM-signals, wherein the signal device is configured to be moved into the PWM-mode or the Bus-mode, depending on the measured voltage $U_{DI/Bus}$, wherein control signals of the first and second control unit are conveyed in parallel to a UART-input and a digital input, DI-input, of the microcontroller the signal arrangement, wherein, in the BUS-mode, the control signals are evaluated only over the UART-input, and wherein, in the PWM-mode, the control signals are evaluated only over the DI-input.

10. The arrangement of claim 9, wherein the control input is configured to be connected to a first control output.

11. A system, comprising:

a first control unit configured to control a signal arrangement using PWM-signals, the first control unit being a programmed control; and the multicolored-signal arrangement of claim 9, wherein the control input of the signal arrangement is connected to the first control output, included in the first control unit, and wherein the first control unit includes a corresponding program configured to generate a first voltage at the control input within the pre-determined time period Δt after a supply voltage is switched on.

12. A system, comprising:

a second control unit configured to control a signal arrangement using an asymmetrical bus-communication; and the multicolored signal arrangement of claim 9, wherein the control input of the signal arrangement is connected to the second control output, included in the second control unit, and wherein the second control unit includes a corresponding program configured to generate a second voltage at the control input within the pre-determined time period Δt after a supply voltage is switched on.

13. A system, comprising:

a first control unit configured to control a signal arrangement using PMW-signals, the first control unit being a programmed control; and a multicolored signal arrangement including a connection to a voltage supply of the signal arrangement, a control input configured to control the signal arrangement, a measuring unit, a movement unit, a microcontroller, and a multicolored-LED, wherein the control input of the signal arrangement is connected to a first control output of the first control unit, wherein the first control unit includes a corresponding program configured to generate a first voltage at the control input within the pre-determined time period Δt after a supply voltage is switched on, wherein the measuring unit is configured to measure a measured voltage, $U_{DI/Bus}$, at the control input of the signal arrangement within the pre-determined time period Δt, wherein the movement unit is configured to move the signal arrangement into a BUS-mode or a PWM-mode, wherein, the signal arrangement, in the BUS-mode, can be controlled using bus-communication, wherein the signal arrangement, in the PWM-mode, can be controlled using PWM-signals, wherein the signal arrangement is configured to be moved into the PWM-mode or the BUS-mode depending on the measured voltage $U_{DI/Bus}$, wherein control signals of the first, second, or first and second control unit are conveyed in parallel to a USRT-input and a digital input, DI-input, of the microcontroller of the signal arrangement, wherein the control signals in the BUS-mode of the signal arrangement are only evaluated over the UART-input, and wherein the control signals in the PWM-mode of the signal arrangement are only evaluated over the DI-input.

14. A system, comprising:
a second control unit configured to control a signal arrangement using an asymmetrical bus-communication; and
a multicolored signal arrangement including a voltage supply connection, a control input configured to control the signal arrangement, a measuring unit, a movement unit, a microcontroller, and a multicolored-LED,
wherein the control input of the signal arrangement is connected to a second control output, included in a second control unit,
wherein the second control unit further includes a corresponding program configured to generate a second voltage a the control input within a pre-determined time period $\Delta t$ after a supply voltage is switched on,
wherein the measurement unit is configured to measure a measured voltage, $U_{DI/Bus}$ at the control input of the signal arrangement within the pre-determined time period $\Delta t$,
wherein the movement unit is configured to move the signal arrangement into a BUS-mode or a PWM-mode,
wherein the signal arrangement, in the BUS-mode, can be controlled with a bus-communication,
wherein the signal arrangement, in the PWM-mode, can be controlled with PWM-signals,
wherein the signal arrangement is configured to be moved into the PWM-mode or the Bus-mode depending on the measured voltage $U_{DI/Bus}$,
wherein control signals of the first, second, or first and second control unit are conveyed in parallel to a UART-input and a digital input, DI-input, of the microcontroller of the signal arrangement, and
wherein, in the BUS-mode of the signal arrangement, the control signals are evaluated only over the UART-input, and
wherein, in the PWM-mode of the signal arrangement, the control signals are evaluated only over the DI-input.

\* \* \* \* \*